United States Patent
Herceg et al.

(10) Patent No.: US 7,194,508 B2
(45) Date of Patent: Mar. 20, 2007

(54) SYSTEM AND METHOD FOR PROVIDING CHARACTER INTERACTIVE INPUT/OUTPUT

(75) Inventors: Michael J. Herceg, Johnson City, NY (US); Richard G. Hartmann, Endicott, NY (US); Daniel L. Krissell, Kirkwood, NY (US); Thomas E. Murphy, Jr., Vestal, NY (US); Francine M. Orzel, Endicott, NY (US); Paul F. Rieth, Apalachin, NY (US); Jeffrey S. Stevens, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 10/108,591

(22) Filed: Mar. 27, 2002

(65) Prior Publication Data

US 2003/0069994 A1 Apr. 10, 2003

Related U.S. Application Data

(63) Continuation-in-part of application No. 09/965,075, filed on Sep. 27, 2001.

(51) Int. Cl.
*G06F 15/16* (2006.01)
*G06F 15/177* (2006.01)
(52) U.S. Cl. .................... 709/203; 709/220
(58) Field of Classification Search ........... 703/23–27; 709/203, 220
See application file for complete search history.

(56) References Cited

U.S. PATENT DOCUMENTS

| 4,574,362 A | * | 3/1986 | Spindel et al. | 710/65 |
|---|---|---|---|---|
| 4,852,127 A | * | 7/1989 | Fraser et al. | 375/340 |
| 5,361,344 A | * | 11/1994 | Beardsley et al. | 703/23 |
| 5,748,888 A | * | 5/1998 | Angelo et al. | 726/26 |
| 6,618,366 B1 | * | 9/2003 | Furukawa et al. | 370/338 |
| 6,895,433 B1 | * | 5/2005 | Slater et al. | 709/220 |
| 7,054,924 B1 | * | 5/2006 | Harvey et al. | 709/220 |

OTHER PUBLICATIONS

Saffady, William, Ed. "*Ampex Display Terminals*", Computer Equipment Review, vol. 5, No. 1, Jan.-Jun., 1983. ISSN 0278-260X. Meckler Publishing, Westport, Connecticut. 1983.

* cited by examiner

*Primary Examiner*—David Wiley
*Assistant Examiner*—J. Bret Dennison
(74) *Attorney, Agent, or Firm*—Shelly M. Beckstrand

(57) ABSTRACT

A system and method for conducting an interactive event dialog on a half duplex block mode connection between a first server and a client and optionally on a full duplex mode connection between a client display based application and a second server. The interactive event processing capabilities of the client are determined and either stored for future use in a logical unit descriptor and referenced by the server in response to a request from the client to interface a local client based display application, or else determined by the first server at the time of that request. Further responsive to the request from the client and determining that the client is capable of interactive event processing a client display based application negotiates an encoding scheme acceptable to said client and communicates with respect to the client in half duplex block mode encoded in accordance with the negotiated encoding scheme and optionally with respect the second server in full duplex mode.

31 Claims, 10 Drawing Sheets

FULL DUPLEX CHARACTER MODE (VTxxx)

HALF DUPLEX BLOCK MODE

SYSTEM AND METHOD FOR PROVIDING CHARACTER INTERACTIVE INPUT/OUTPUT

CROSS REFERENCE TO RELATED APPLICATION

This application is a Continuation-In-Part of U.S. patent application Ser. No. 09/965,075, filed Sep. 27, 2001 for "System and Method for Providing Character Interactive Input/Output".

BACKGROUND OF THE INVENTION

1. Technical Field of the Invention

This invention pertains to inter-operability among various computer platform architectures existing in a network. More particularly, it pertains to providing the look and feel of character interactive I/O operation across separate architectures.

2. Background Art

In a client/server computer network, inter-operability among the various platform architectures that exist in the network is a primary goal of the network. In particular, client/server network applications such as Telnet, SMTP, FTP, LPD, etc. are expected to be able to work equivalently, independent of the platform architecture on which they are implemented. However, due to differing architectures of the various platforms, there are often obstacles that severely limit developing and providing a common "look and feel" in terms of network application user interfaces presented on each platform.

One such architecture example is the half-duplex block-mode display devices supported by the IBM 5250 architecture iSeries (AS/400) and 3270 (S/390) platforms. Another architecture example is the character interactive I/O architecture, such as supported by UNIX (including AIX, Linux, etc.)

There is a need in the art for a system and method for providing the same "look and feel" of network applications on each platform, even though they must be supported differently by the architectures. The physical rendering of the client user interface can often limit the logical requirement of the server application in the network.

For example, when using Telnet from a UNIX platform to communicate with an iSeries platform, it is expected that using Telnet from the iSeries platform to the UNIX platform (the reverse direction) will work in an equivalent manner and have similar "look and feel" at the user interface. Failure to work in such a bi-directional manner is an inter-operability problem. Failure to inter-operate creates significant user dissatisfaction due either to loss of functionality or the need to learn custom circumventions or work arounds. Worse, lack of inter-operability leads to inability to market or sell a product as a solution in a client/server computer network.

One such networking inter-operability problem exists between the iSeries and the UNIX platforms. The iSeries is a half-duplex block-mode display device architecture, which is characteristic of all 5250 and 3270 based display devices and any clone implementation. The UNIX box is a character interactive echo-plexed architecture. UNIX based display sessions are based on VTxxx type terminals and define a standard character interactive I/O keyboard as the default that must be supported by any display clients wishing to run traditional text display based UNIX applications. In the Telnet protocol, a client host rendering a display should emulate the VTxxx (i.e. VT100, VT220) based display and keyboard characteristics to the best of its ability. Due to the IBM 5250/3270 display device architecture of half-duplex block-mode buffering, generally characters are collected in a buffer until an action identifier (AID) key is entered (such as Enter, program function PF1–PF24 keystrokes, etc.) and all the keystrokes in the buffer transferred to the iSeries application, rather than processed one at a time by an application. This conflicts with the need for a VTxxx type terminal to do character interactive I/O, which essentially means it needs to process each character as it is typed. This means each character keystroke typed in a half duplex block mode (iSeries Telnet) client session that is running a character interactive I/O application on a UNIX server does not necessarily get processed within the context of the server application as a VTxxx keystroke. Instead, it is buffered in the iSeries display device until an action keystroke is pressed. The action keystroke required is normally an enter or program function (PF) key. This is a character interactive I/O inter-operability problem on the Telnet client side.

An example of a character interactive I/O inter-operability problem involves password fields. In a native character interactive ASCII environment when the client connects to a UNIX Telnet server, the user is presented with a login (or sign-on) panel in which to enter the profile or userid name and password. Typically, each character of the profile or userid name is echoed to the screen as it is typed in, and the cursor position moves with each character typed in. However, each character of the password is hidden by the application itself, which echos a replacement character or characters, such as an asterisk "*", blanks, XXXX, etc. . . . , or by not echoing a character at all and leaving the cursor position unchanged. Unfortunately, again due to half-duplex block-mode architecture design, character substitution does not automatically occur for an iSeries Telnet client or other similarly architected clients operating in half duplex mode. The current iSeries Telnet client circumvention requires the user to press the program function key assigned to the special function "hide keystroke echoes until the next action key", which is set to PF6 by default for iSeries Telnet client. This local "hotkey function" signals the iSeries Telnet client program that the characters that follow are to be hidden. The iSeries Telnet client refreshes the screen input fields with non display attributes therein instructing the display device to simply send in the keystrokes with the next action key (AID) to avoid displaying the keystrokes to the screen. This also has the side effect of defeating the ability of the application to substitute any preferred different "echo" characters, such as echoing a "XXXX", or "**" or "??" string for each character typed (something Lotus Notes does). Again, this solution is rather awkward from a customer perspective, requires knowledge of the circumvention and is not intuitive.

Another example of a character interactive I/O inter-operability problem relates to the use of graphical characters in different contexts. Consider a Lotus 1-2-3 spreadsheet application to work with saved 1-2-3 files. Lotus 1-2-3 has a classic menu hotkey, where the spreadsheet application recognizes the "/" as a special version of the introducer character. In the context of the Lotus 1-2-3 application, the "/" character is to be used as a command to pop up an application selection menu, not as a direct character to be echoed to the display or typed into the spreadsheet itself. In order to send the "/" alone as a real ASCII client would, the iSeries has to use the PF11 ("send without carriage return") trick to cause a client Telnet to avoid sending the Enter keystroke equivalent for ASCII carriage return (0x0D).

These examples are deviations from VTxxx defacto standards required by users of 5250/3270 architectures, and it forces users to memorize custom circumventions that are generally not well-known to the average character interactive I/O network user. These circumventions are not well received by customers when 5250/3270 platforms are marketed as a solution in any network with character interactive I/O operating systems, and ironically do not inter-operate with Linux, or AIX (a RISC platform).

Full Duplex

Referring to FIG. 1, full duplex operation is illustrated. VTxxx is full-duplex character interactive mode support. This means that as each character is typed on the client workstation, it is sent to the UNIX server for processing. The UNIX server application then decides based on the content of the dialogue whether to echo the character to the client workstation so that it appears on the display terminal. Thus, in a native VTxxx based display, each character typed makes a full round-trip path from the client workstation to the UNIX server and back to the client workstation for display. As is represented by lines 24 and 25, keystrokes entered at keyboard 20 are sent directly by client workstation 22 to character interactive application 23. As is represented by lines 26 and 27, character interactive I/O application output is returned directly to display 21. The round trip 24, 25, 26 and 27 may occur (again the application may choose to not echo or advance the cursor) for each keystroke, that is for every character input at keyboard 20.

Half Duplex

Referring to FIG. 2, half duplex operation is illustrated, such as would be implemented in an iSeries (5250) configuration. In this configuration, keystrokes 24 entered at keyboard 20 are accumulated in buffer 30. If local echoing is on (normally, echoing is on by default), as is represented by element 35, these keystrokes 24 will be echoed locally to display 21 (as it is typed on the keyboard 20). As is represented by element 33, when an enter action key is detected in buffer 30 from keystrokes 24, buffered data is sent to application 32 for processing. Application output 34, 36 is sent to client display 21. The round trip represented by elements 24, 30, 33, 34 and 36 occurs when an action key is depressed at keyboard 20 and detected by client workstation 31.

The above discussion of half duplex (see FIG. 2) is oversimplified in that there is no visible TCP/IP network in the figure. While such a configuration may exist in hardwired networks that use dumb terminals connected via Twinax cabling, the trend in current technology is toward a TCP/IP, or the like, network. (The present invention applies to any client including SNA or Twinax and is not limited to TCP.)

Cascaded Half Duplex

Referring to FIG. 3, in a TCP/IP network, dumb terminals are replaced with terminal emulators that run on PC workstations and are essentially Telnet clients. This emulator configuration operates in cascaded half duplex mode, a half duplex block-mode imitation of character interactive I/O. Most iSeries customers connect to the iSeries in a TCP/IP network using a Telnet client 40 bundled as part of a package. Client Access Express is an example of such a package. In such a configuration, connectivity for the iSeries from the client workstation 31 using half duplex block mode is achieved without any keystroke problems for applications written with half-duplex block mode architecture and running on the iSeries 43. The problem with half duplex block mode arises when that same client 31, which is already connected to the iSeries 43, then tries to connect to a UNIX platform 48 using the iSeries Telnet client 45 and run applications 49 on the UNIX platform. That is, workstation 31 uses a terminal emulator (e.g., Client Access Express) to connect to iSeries 45 via Telnet server 43 and gets a command line 44. At command line 44, Telnet client 45 is used to cascade to UNIX Telnet server 48 and run application 49. Application 49 needs VTxxx mode (full duplex character mode represented by lines 46, 47) to work properly with keyboard 20 and display 21, but block-mode operation of workstation 31 interferes.

Illustrated in FIG. 2 is the operation of a 5250/3270 configuration, which requires that all data be in EBCDIC format. Illustrated in FIG. 3 is a UNIX platform, which requires that the EBCDIC be converted at element 39 to ASCII by the iSeries Telnet client before it is put on the communication link to the UNIX box 48. Thus, ASCII data goes out on line 46 and returns on line 47 to client 45. Not only is data translated in converter 39, but action keys in EBCDIC such as the enter (0xF1) key are converted into equivalent ASCII control codes.

Non-Intuitive Non-Graphic Key Transmission

One of the problems that exists within 5250/3270 architecture is the ability to naturally send non-graphic keys such as 'Control', 'Shift', and 'Alt' from the Telnet client emulator, or local workstation to the iSeries (AS/400) Telnet server. Traditional ASCII architecture (meaning PC's or workstations) use the non-graphic in a manner not quite compatible with 5250/3270 architecture. What this means is that certain types of keystrokes such as Ctrl-C (which normally indicates a break or interrupt process request) do not work like a normal ASCII attached keyboard. In an ASCII network environment, a Ctrl-C is sent immediately to the running client application, while in a 5250/3270 architecture network, the Ctrl-C gets buffered temporarily instead of being sent immediately. An iSeries circumvention to make the Ctrl-C keystroke work requires a user to go through various gyrations.

To send a Ctrl-C character from an iSeries native Telnet client to a character interactive I/O server application using the existing 5250 architecture the following non-intuitive steps are required:

1. The user must type in an "introducer character" into the input field (which is a "&" by default). This is interpreted by the iSeries Telnet Client emulator application to indicate a special keystroke operation is being signaled. Telnet Client input parameters also allow the user to substitute an alternative "introducer character", if so desired.
2. The user must then directly behind the introducer character type in the graphic character capital "C".
3. The user must then press the Program function (AID) Key assigned to yet another special function called "send without Carriage Return", which by default is set to PF 11 for iSeries Telnet Client implementations when operating in VT100 mode.
4. After entering this non-intuitive and lengthy sequence the Telnet client is interrupted (due to the AID) and it interprets the introducer ("&") and the graphic character ("C") as the special "Ctrl-C" sequence. It then subtracts 0x40 from the "C"(0x43) to create the 0x03 byte and transmits the OxO3 byte to the UNIX host without appending the normal Carriage Return (OxOD) byte on the end. All of the special key sequences the user types are passed to the iSeries Telnet emulator application by a "special hot-key handshake" to get the attention of the iSeries (native) Telnet client to intercept, interpret and convert to the user's intended hexadecimal data stream that which would, under normal intuitive circumstances, be initiated by a simple keyboard keystroke combination.

As this example shows, there is a lot to remember to make Ctrl-C or any Ctrl modifier key sequence work. What is worse, there is no similar sequence to handle Alt or Shift type sequences. Even though the user may have a 128 character PC keyboard, the half-duplex block-mode architecture operation of the 5250 (and similar) platforms severely limits its use.

Many programs rely on these non-graphic keys either in combination with other keys or separately for program control. In many cases, these key sequences are a hallmark of the user interface hence they severely limit the potential for "porting" such applications to the iSeries or other mainframe hosts that share similar limitations of half-duplex, EBCDIC . . . (i.e. zSeries (S/390)) when interacting with Linux, AIX, etc.

These examples are deviations from defacto ASCII standards and circumventions required by users of 5250/3270 architectures, and it forces memorization of custom procedures that are generally not well-known to the average character interactive I/O network user. These custom procedures and circumventions are not well-received by customers when manufacturer's platforms are marketed as a solution in any network with character interactive I/O operating systems and applications such as the Linux, AIX, and so forth. Consequently, there is a need in the art for a mechanism for sending non-graphic keystrokes within the 5250 architecture and having them processed as if they were ASCII keystrokes.

There is a need in the art for a system and method which solves the character interactive I/O inter-operability problem on the iSeries Telnet emulator application when interacting with Linux, AIX, etc.

It is, therefore, an object of the invention to provide an improved system and method for rendering a common "look and feel" on different platforms and architectures.

It is a further object of the invention to provide a system and method for character interactive I/O in a half duplex block mode environment.

It is a further object of the invention to provide a system and method for sending non-graphic keystrokes within the 5250 or like architectures and have them processed as if they were native ASCII keystrokes.

It is a further object of the invention to provide a system and method for passing keystrokes typed, both graphic and non-graphic, to the iSeries or the like application without requiring that the enter key be pressed before sending data.

It is a further object of the invention to provide a system and method for discovering a display which is capable of enhanced interactive functions thru WSF/LUD bit testing.

It is a further object of the invention to provide a system and method for probing a supporting device for encoding schemes.

It is a further object of the invention to provide a system and method for selecting an encoding scheme known to imply a particular encoding method.

It is a further object of the invention to provide a system and method for passing processing parameters associated with an encoding scheme.

It is a further object of the invention to provide a system and method for passing mapping tables or other encoding scheme modification fields to a workstation.

It is a further object of the invention to provide a system and method for improving over the auto-enter method of triggering a text based non-control character keystroke by conveying such via an encoding scheme"

It is a further object of the invention to provide a system and method for conveying events including control-characters, alternate-characters, shift-characters, text based characters and virtually any interactive event including Mouse-based events such as pixel coordinates, mouse buttons, and light-pens.

SUMMARY OF THE INVENTION

A system and method for establishing an interactive event dialog with a client by establishing a half duplex block mode architecture connection with the client; negotiating capability indicia identifying the client as capable of interactive event processing; communicating with a capable client over the half duplex connection according to an encoding scheme accepted by the client; and responsive to a request from the client for establishing a cascaded session with a remote server, communicating over a full duplex connection with the remote server.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
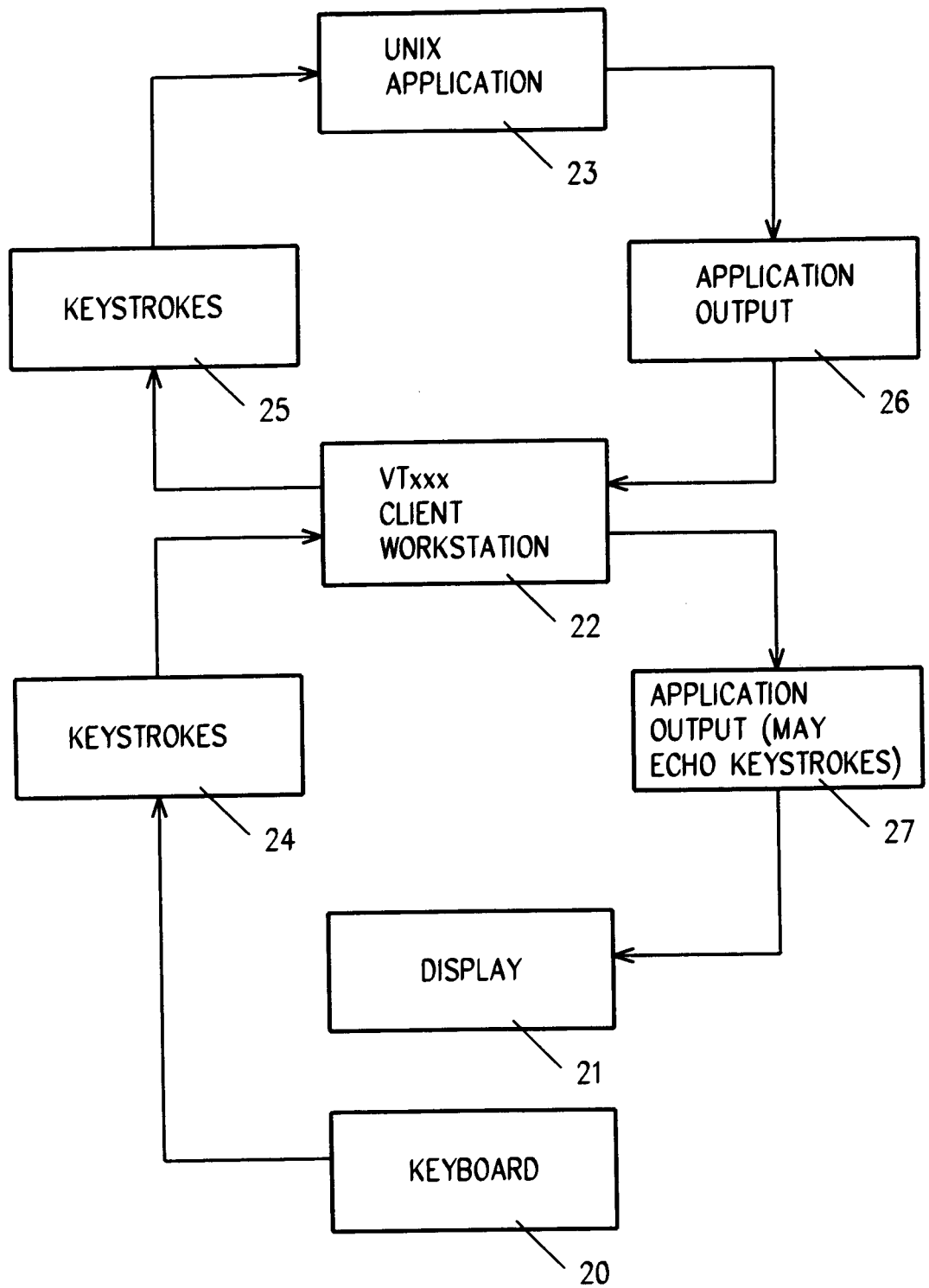
FIG. 1 illustrates full duplex character mode in accordance with the prior art VTxxx architecture.
Figure 2:
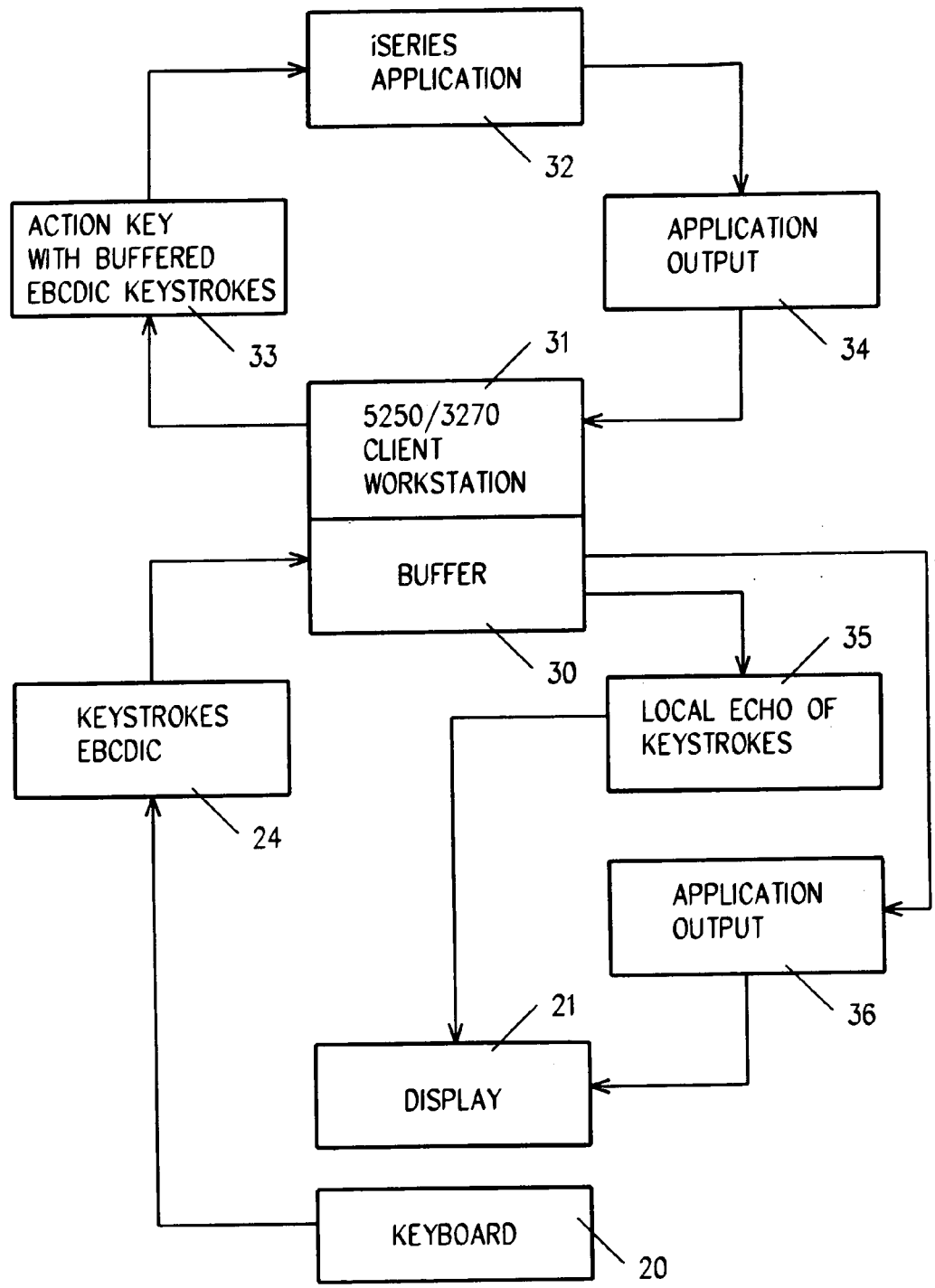
FIG. 2 illustrates half duplex block mode in accordance with the prior art 5250/3270 architecture.
Figure 3:
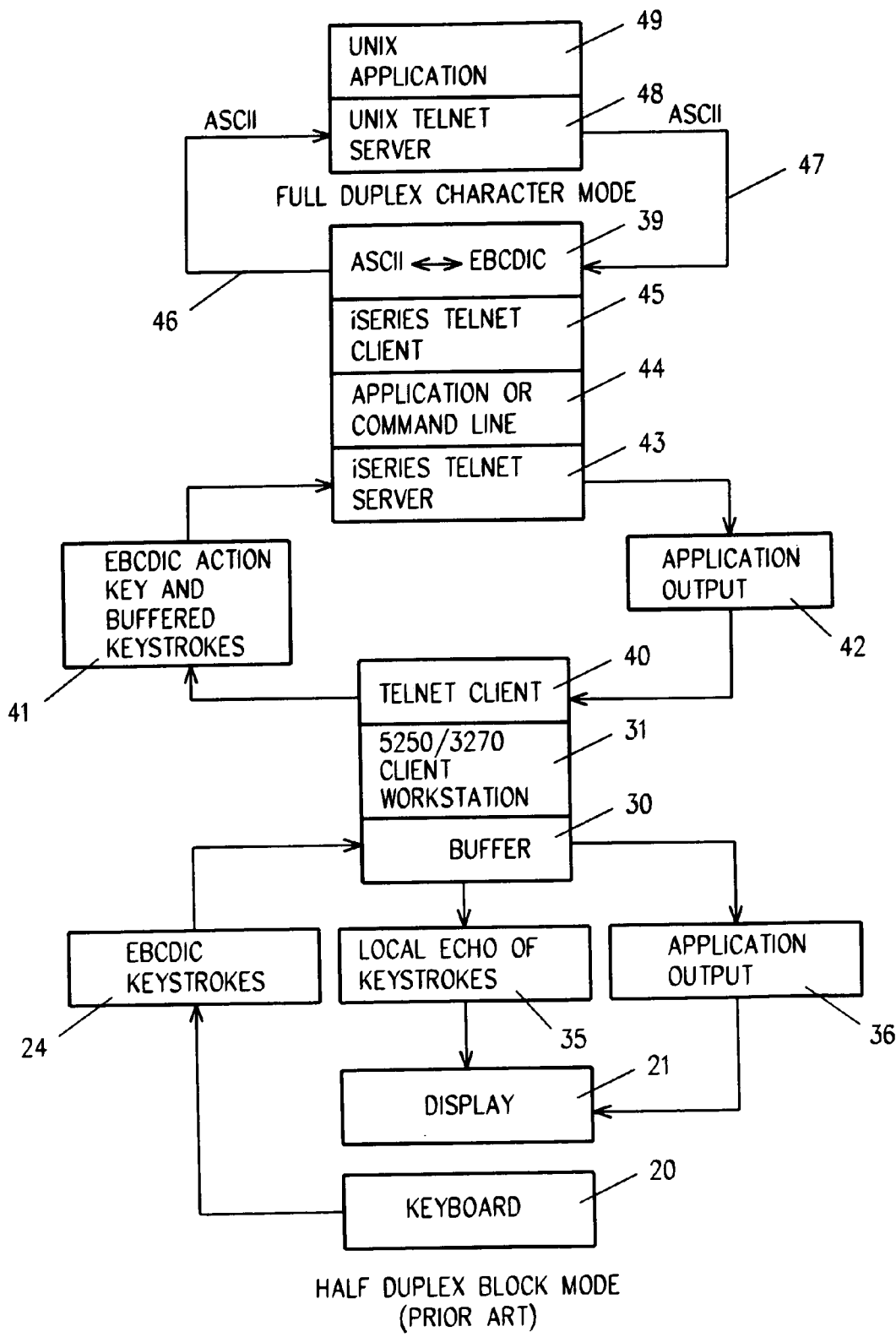
FIG. 3 illustrates half duplex block mode in combination with full duplex character mode, and illustrates the problem configuration of the prior art addressed by the present invention.

Two preferred embodiments are presented for character interactive I/O in a half duplex block mode environment. In accordance with a first preferred embodiment of the invention, an auto-enter non-display character position on a local display is used to receive text based keystrokes from the keyboard. In accordance with a second preferred embodiment of the invention, interactive events and key combinations are communicated across an interactive interface using an interactive interface control command, a capability bit, and negative acknowledgment and error detect sense codes. This second preferred embodiment of the invention affords the ability to convey the graphic text based characters interactively without the use of the auto-enter non-display input field. In an exemplary embodiment, this is accomplished on an iSeries (5250) display architecture using a 6B command, a Write Structured Field capability bit, and 10050158–10050159 sense codes.

An exemplary embodiment of the invention uses an iSeries Telnet emulator application, although the invention could be used by any application running on an iSeries. In this exemplary embodiment, three specific non-graphic keys ('Control', 'Shift', and 'Alt') may be sent to the iSeries application, but the design is left flexible to add any special key sequences such as an extender key in combination with a displayable graphic or text character, the implementer wishes to send. While the invention can be used by any application on the iSeries, this exemplary embodiment focuses on an iSeries Telnet client. Other examples include a Linux application ported to the iSeries dependent upon natural character interactive I/O activity, wherein, it can see all keystrokes, or combinations thereof.

In an exemplary embodiment, in a half-duplex block-mode device, such as an emulated 5250 display device with buffering of typed characters, a managing application directs the intelligent workstation based display emulator to convey all keystrokes, keystroke combinations or events using a preferred encoding scheme therein avoiding block-mode buffering associated with the native architecture. Once received by the application these keystrokes and events can be processed in the context of the application logic. For the example application of the iSeries Telnet Client, the text character, or keystroke control character can then be converted from EBCDIC to ASCII and transferred to the ASCII based Telnet Server host for processing in the context of the distant targeted ASCII based character interactive I/O server application.

Further, a method is provided to the directing application (in control of the 5250 architected rendering workstation emulator) to discover if a workstation is capable of such enhanced functions, and if so, specifically directing the intelligent workstation based emulator to encode inbound (client emulator to server application) traffic consistent with application logic. This latter feature by decreasing I/O based porting activities enables preservation of such application logic.

Several acronyms are used herein, including the following:

| | |
|---|---|
| FTP | file transfer protocol |
| IPX | Internet packet exchange |
| LPD | line printer daemon (a daemon is a server, which is a listening job or process.) |

-continued

| | |
|---|---|
| LUD | logical unit descriptor |
| RISC | reduced instruction set computing |
| SBA | set buffer address |
| SMTP | simple mail transport protocol |
| SNA | system network architecture |
| VT100 | character interactive mode |
| WSF | write structured field |
| WSSF | write single structured field |

VT100 is a Digital Equipment Corporation (DEC) model that has become the de facto standard for text based display mode.

Single Character Auto-Enter Non-Displayable Input Field

Figure 4:
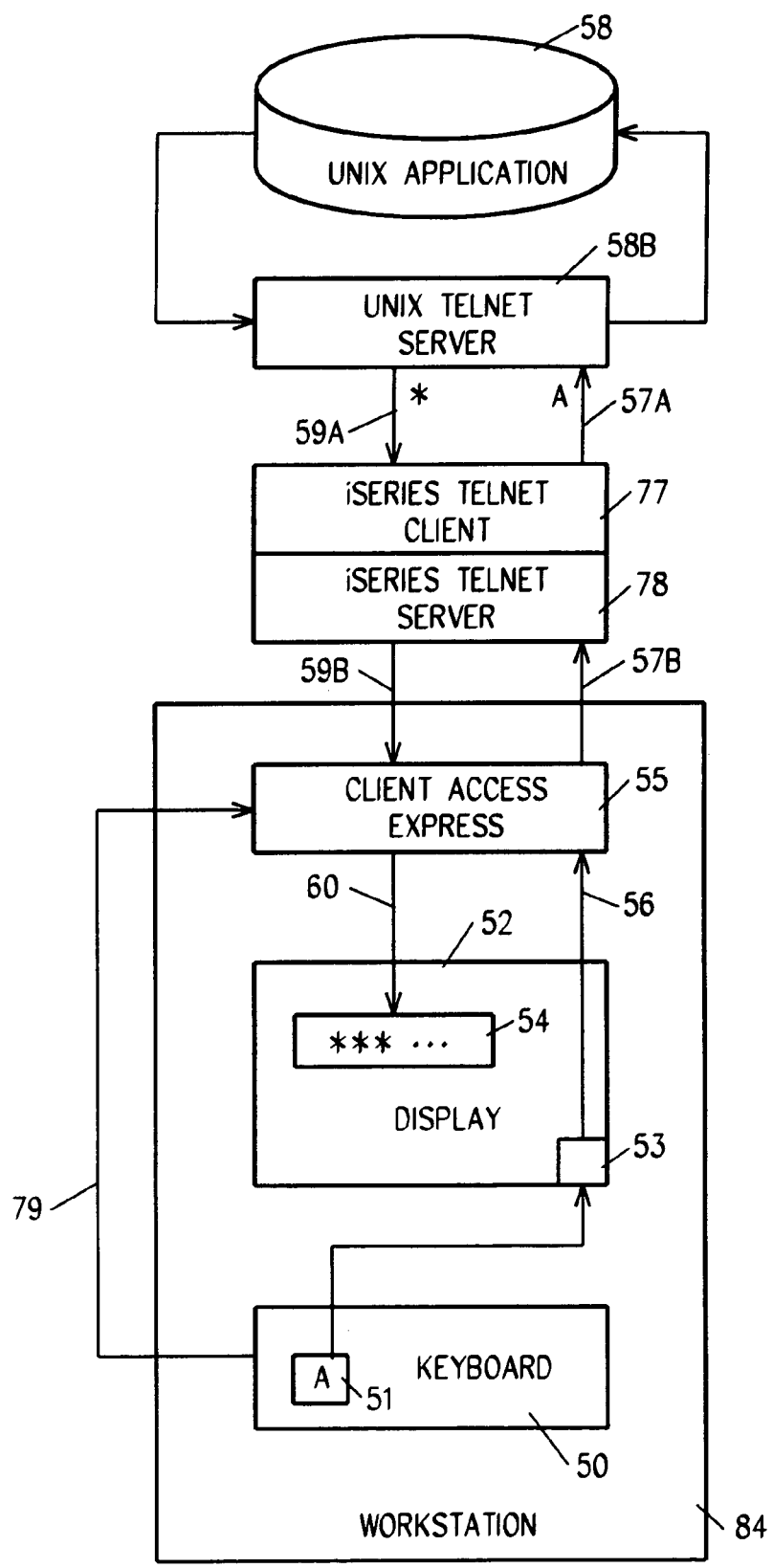
FIG. 4 illustrates a preferred embodiment of the invention, including an auto enter non-display character position on a local display for receiving all keyboard entered data.

Referring to FIG. 4, 5250 display device 52 is configured or defined (with respect to keyboard 50) as comprising a single character input field 53 that has auto-enter and non-displayable attributes, as distinguished from the normal 1920-byte character input field that is possible on a 24×80 display device. The auto-enter attribute acts like an internal windows based visibility (scan codes, etc. . . ) and affords the emulator the ability to send an action key (AID) in this context, since it causes an attention signal 79 to the workstation running Client Access Express 55 to occur. This attention signal 79 is then passed to the iSeries Telnet Client 77 via the iSeries Telnet Server 78 as represented by line 57B. The non-displayable attribute prevents any local echo from showing an input character on the display.

As characters 51 are typed at workstation keyboard 50, an attention identifier (AID) 79 is signaled from the workstation (running iSeries Access) 55, to the iSeries Telnet client 77 via the iSeries Telnet server 78 as represented by line 57B, and a 1-byte character input field content is retrieved from a keystroke buffer 53 and sent, as is represented by line 56, workstation (running Client Access Express) 55 and passed on to iSeries Telnet client 77 via the iSeries Telnet server 78 as represented by line 57b. ISeries Telnet client 77 then translates the character from EBCDIC to ASCII and safely transmits the keystroke, as is represented by line 57A, to remote UNIX application 58 via UNIX Telnet Server 58B, where the keystroke is interpreted within the context of the UNIX application 58. As is represented by line 59A, the output (if any) of UNIX application is then returned to the iSeries Telnet client 77 and passed on to workstation (running Client Access Express) 55 via the iSeries Telnet server 78 and, as represented by line 60, to workstation display 52 (which is "business as usual").

Thus, by configuring display device 52 to a single character field 53, processing occurs immediately for each character 51 typed at keyboard 50, as opposed to buffering many keystrokes while waiting for an action or AID key.

In accordance with this embodiment of the invention, a user typing a password, for example, for a character interactive I/O application 58 would see, in password display field 54 of display 52, the effect of application 58 hiding each keystroke of the password and, as shown in FIG. 4, echoing back another character, in this example the "*" character, instead of seeing the password echoed to field 54 of display 52 as would typically occur for 5250 block-mode devices. This removes the need to use circumventions, such as the PF6 "hide keystroke echoes until the next action key" work around previously described.

This significantly enhances the iSeries's heterogeneous connectivity to more seamlessly connect with character interactive I/O dependent operating systems such as UNIX.

Typical Network Environment

Figure 5:
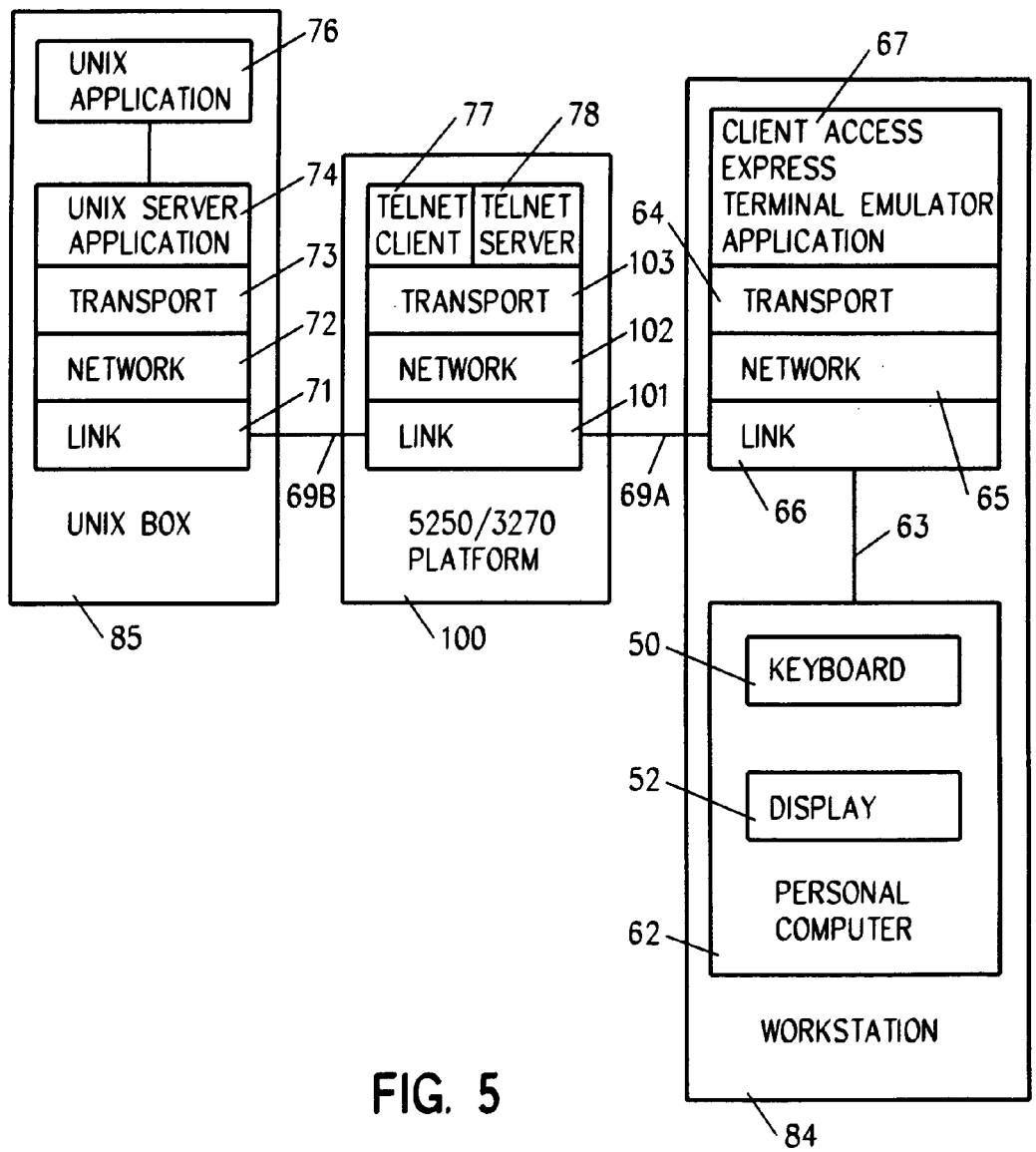
FIG. 5 illustrates a preferred embodiment of the invention, including a network connection between the workstation and Telnet client.

Referring to FIG. 5, the embodiment of the invention shown in FIG. 4 is further described, illustrating a typical network environment.

A user terminal 62 including keyboard 50 and display 52, is connected through network 69A to iSeries Telnet server 78 and iSeries Telnet client 77 and ultimately via network 69B to server application 74 and host application 76. This is done via protocol stacks for workstation 84, 5250/3270 platform 100, and UNIX box 84. These protocol stacks include a plurality of layers 64–67, 101–103, and 71–74, respectively, in, for example, a TCP/IP protocol suite (as further described in connection with FIG. 6). In this example, terminal emulator 67 is a Telnet client, such as Client Access Express.

TCP/IP Protocol Suite

Figure 6:
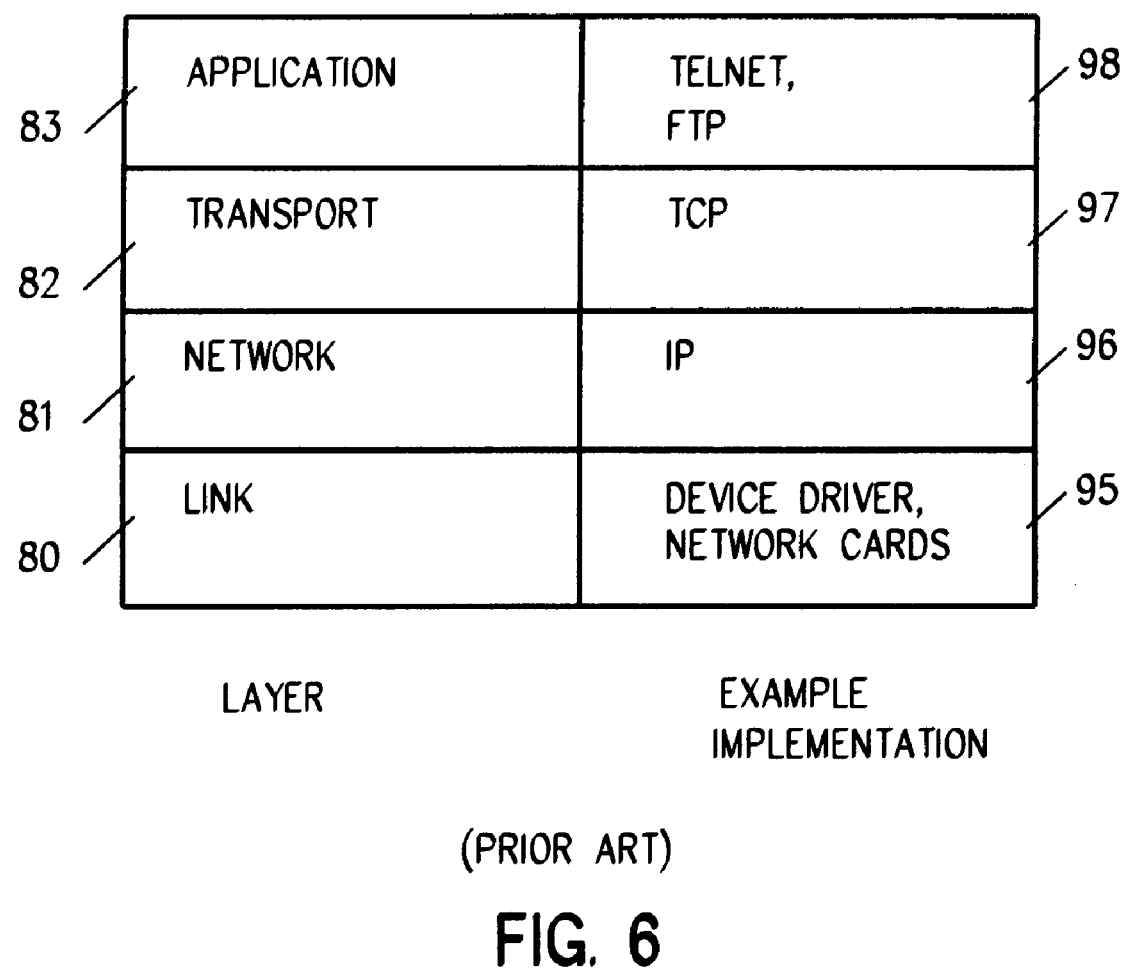
FIG. 6 illustrates the four layers of the TCP/IP protocol suite.

Referring to FIG. 6, the four layers 80–83 of the TCP/IP protocol suite include application layer 83, such as Telnet or FTP 98, transport layer 82, such as TCP 97, network layer 81, such as IP 96, and link layer 80, such as device driver or network cards 95. Through the technique of encapsulation, direct communication between protocol stacks occurs only between equivalent layers. For example, referring to FIG. 5, link layer 66 communicates with link layer 71, network layer 65 communicates with network layer 72, transport layer 64 communicates with transport layer 73, and application layer 67 communicates with application layer 74.

In accordance with a further embodiment of the invention, workstation 84, iSeries Telnet server 78 and iSeries Telnet client 77 connecting to UNIX server 85 together represent a cascaded connection, which is a sequence of connections from the users local workstation to the final remote server on which the application is running, requiring character dependent input/output in full duplex mode.

Client Emulator Supported Features Determination

Figure 7:
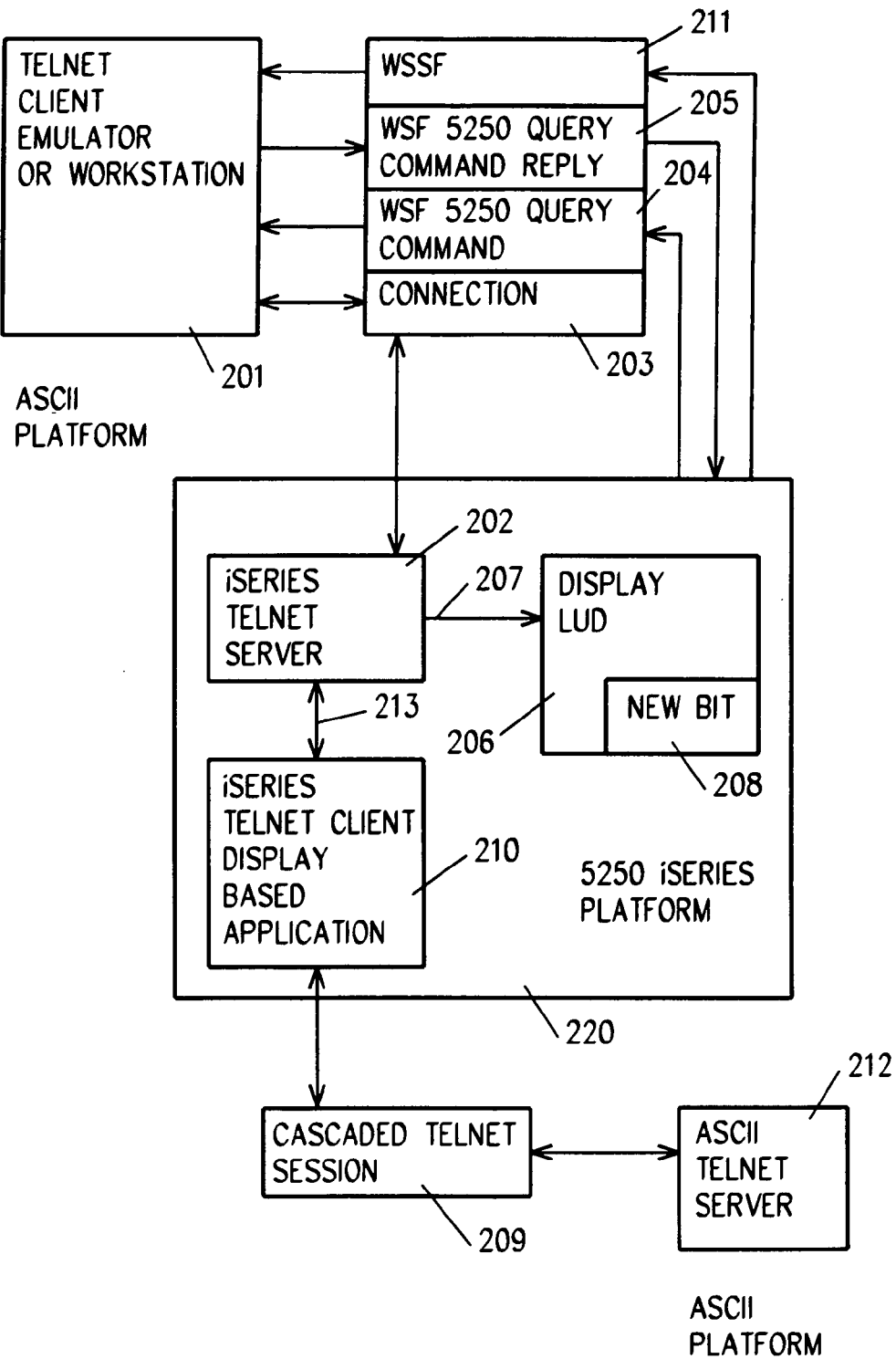
FIG. 7 illustrates the network connection and data flow for interactive character input/output in accordance with a preferred embodiment of the invention.

Referring to FIG. 7, in accordance with an exemplary embodiment of the invention, ASCII platforms 201, 212 communicate with 5250 iSeries platform 220. Platform 220 includes a Telnet server 202, a Telnet client display based application 210, and a display logical unit descriptor (LUD) associated space 206 which includes a new bit 208.

In operation, in anticipation of a client 201 request for establishing a 5250 session over connection 203 between a Telnet client emulator or workstation 201, the site of the rendering display, and a Telnet server 202 over a cascaded Telnet session 209, or upon receiving a request for a connection with an application at platform 220, a subsystem on the iSeries platform 220 sends a Write Structured Field (WSF) 5250 Query Command 204 to Telnet client display/keyboard emulator 201 to determine the capabilities of the emulator or workstation. Emulator 201 responds with a WSF 5250 Query Reply structure 205, reflecting supported features. As is represented by line 207, these features may be saved in Logical Unit Descriptor (LUD) associated space 206, for subsequent reference by display-based applications 210 that may need to interact with a rendering display device. A Write Single Structured Field (WSSF) command 211 is used asynchronously by the application to control the feature or function (e.g. activate or deactivate the feature). Actions 204, 206 and 211 all occur over connection 203.

An example of such a display-based application 210 is a Telnet client, which can emulate an ASCII (VTxxx) terminal when it initiates a dialogue with a distant UNIX based server host, yet interacts with the local user at his/her local rendering device. In the case of the iSeries this requires all screens to be native 5250 EBCDIC datastreams. Hence, the iSeries Telnet Client 210 acts as a translator or protocol converter as it receives native ASCII (VT100 datastream) screens from the distant host application presented through distant ASCII host's Telnet server, then converts these screen images to the native iSeries 5250 architected screen equivalent datastream.

In a similar sense, all keyboard input from the rendering screen (at the iSeries client 201) Telnet interface arrives in native 5250 format, but is converted to the ASCII VT100 protocol of the distant ASCII host 212 architecture.

A Telnet Client Emulator 201 on a local iSeries host 220 while running in ASCII (VT100 or VT220 mode) is now able to send the Ctrl non-graphic modifier characters to a Telnet server 202 just as if the client 201 were running on a PC or workstation without forcing the user to learn a sequence of un-natural keystroke combinations. iSeries Telnet server 202 supports ASCII terminals 201 in addition to 5250 and 3270 terminals, and therefore can interoperate with ASCII, 5250 and 3270 platforms.

Negotiations 204, 205 and 211 occur over connection 203 and are standard in iSeries Telnet server 202 support today. In accordance with the preferred embodiment of the invention, negotiation 205 is enhanced with the addition of a new feature bit 208 definition, and also by a new feature command definition for WSSF negotiation 211.

Query Command Reply Enhanced Capability Bit

A WSF 5250 Query Command Reply bit 208 in the structure returned to the Telnet server 202 is a bit in the existing WSF 5250 Query Command Reply structure that is used in this exemplary embodiment of the invention and is stored in LUD 206. This new bit 208 indicates the (specific) emulator or workstation 201 has the ability to send extended keyboard characters such as Ctrl, Aft and Shift using a 5250 data stream (explained below). Specifically, this may be byte 18, bit 6 of the WSF 5250 Query Command Reply 205 structure. If this bit is '1' it means the extended keyboard characters are supported, otherwise they are not supported. In accordance with this specific, exemplary embodiment, it means this workstation 201 is capable of receiving an interactive interface control command, which is, for this example, the 6B structured field for controlling the interactive interface.

Query Command

Figure 8:
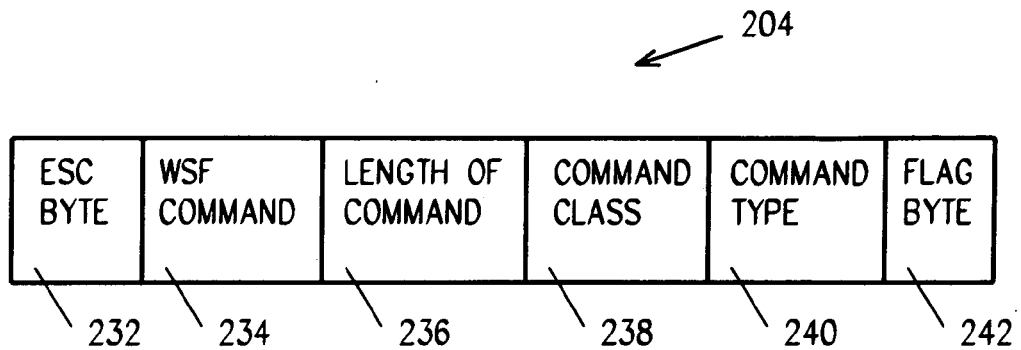
FIG. 8 illustrates a typical 5250 WSF Query Command structure layout.

Referring to FIG. 8, a 5250 WSF Query Command 204 includes escape byte 232, write structure field (WSF) command 234, length of command 236, command class 238, command type 240, and flag byte 242. An exemplary hexadecimal stream is as follows:

OF 43 0005 D9 70 00 where,

| | |
|---|---|
| 0F | is escape character 232, |
| 43 | is WSF command 234, |
| 0005 | is length of command 236 (2 bytes), |
| D9 | is command class 238, |
| 70 | is command type 240, where 70 = Query, and |
| 00 | is flag byte 242, where bits 1–7 are reserved and bit 0 equals 0 for a Query command. |

Query Command Reply

Figure 9:
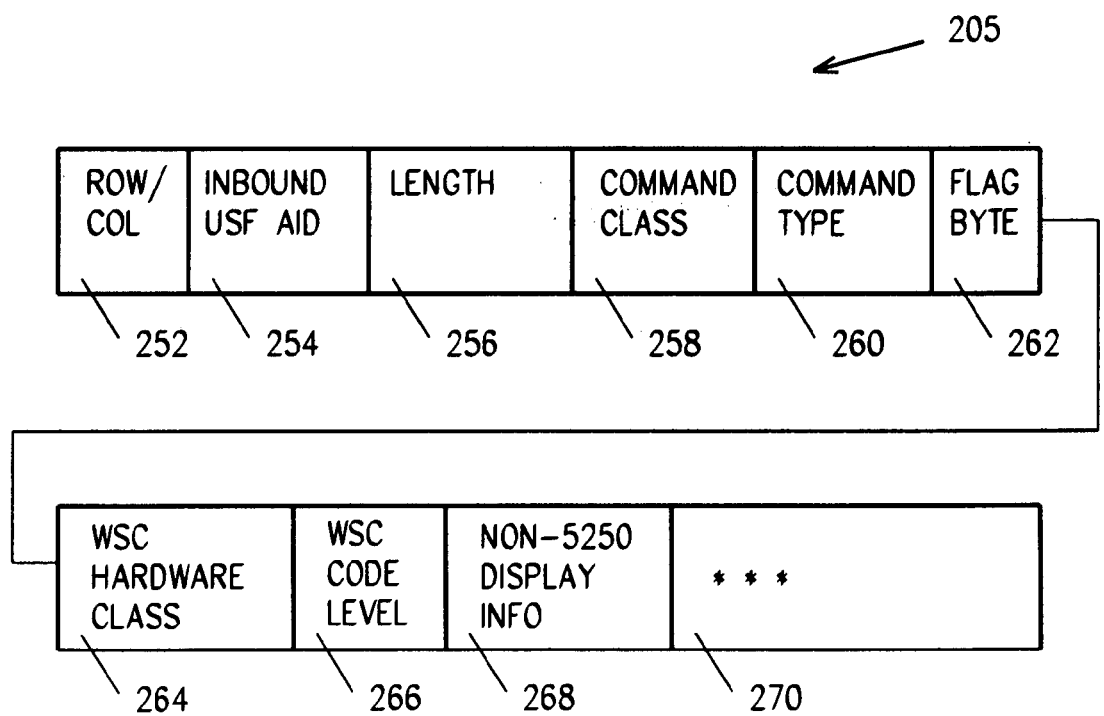
FIG. 9 illustrates a 5250 WSF Query Command Reply structure layout.

Referring to FIG. 9, a 5250 WSF Query Command Reply structure 205 includes row/column field 252, inbound write structure field AID 254, length 256, command class 258, command type 260, flag byte 262, WSC hardware class 264, WSC code level 266, and non-5250 display information 268. A sample hexidecimal stream is as follows:

rrcc 88 nnnn D9 70 80 nnnn nnnnnn nnnnnnnnnn nn nnnn . . .

where,

| | |
|---|---|
| rrcc | is row/column 252 (2 bytes), |
| 88 | is inbound WSF AID 254, |
| nnnn | is length 256 (2 bytes), |
| D9 | is command class 258, |
| 70 | is command type 260 (70-Query), |
| 80 | is flag byte 262, where bits 1–7 are reserved and bit 0 equals 1 for Query reply (bit 0 is the most significant bit MSB) |
| nnnn | is WSC hardware class 264 (2 bytes), |
| nnnnnn | is WSC code level 266 (3 bytes), |
| nnnnnnnnnn | is reserved (5 bytes), |
| nn | is non-5250 display information 268, where bit 0 = OVVM carriage return character chooser, bit 1–5 = Reserved, bit 6 = new bit 208 for 6B capable support (previously reserved), bit 7 = true transparency |
| nnnn . . . | is rest of structure 270 |

Invariably, the normal sequence of events associated with establishing a workstation's 201 connection 203 will include issuance of the WSF/Query command 204. At this time, the LUD 206 is updated for future reference. Such reference with regard to the referenced bit (previously reserved) 208, may happen at any time when an invoked application dependent on character interactive I/O is invoked. Once the invoked application queries the LUD 206 and confirms the capability exists, it can then issue the WSSF command 211 carrying the 6B structured field 268 bit 6.

Write Single Structured Field (WSSF) Command

Figure 10:
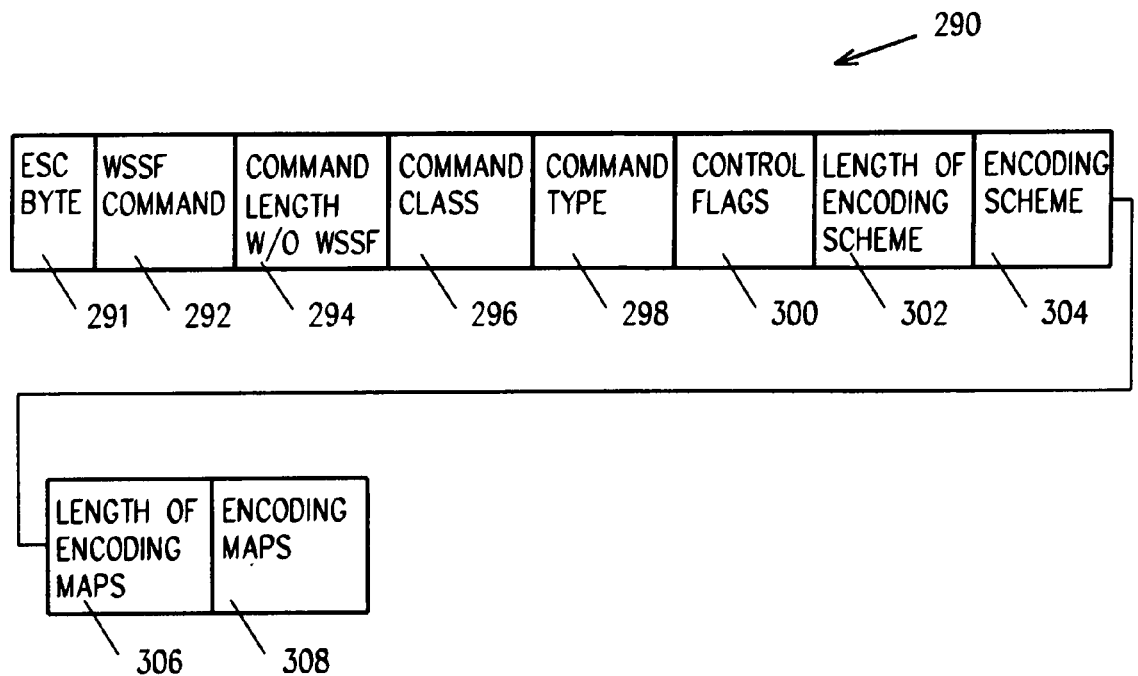
FIG. 10 illustrates a 5250 WSF Query Command with the new 6B command of an exemplary embodiment of the invention.

Referring to FIG. 10, WSSF command 211 includes WSSF command field 292, command length without WSSF 294, command class 296, feature enable/disable command 298 (which in this example is 6B), flags 300 for indicating the state of extended keyboard characters, length of encoding scheme 302, encoding scheme 304, length of encoding maps 306, and encoding maps 308. An example write single structure field (WSSF) hexadecimal code stream 290 is as follows:

04F4 LLLL D9 6B FF LE ES LMLM EM where,

| | |
|---|---|
| 04F4 | is WSSF command 292 (2 bytes), |
| LLLL | is length 294 of command without WSSF 292, |
| D9 | is command class 296 (2 bytes), |
| 6B | is new command type 298 |
| FF | Control Flag 300 (1 byte) - The first bit is used disable (0) or enable (1) the new feature |
| LE | Length 302 of encoding scheme (1 byte) |
| ES | Encoding scheme 304 |
| LMLM | Length 306 of encoding maps (2 bytes) |
| EM | Encoding maps 308 |

Use of Query Reply Feature Capability Bit

Referring to FIG. 9 in connection with FIG. 7, new feature bit 208 in non-5250 display information 268 of WSF query reply 205 is used as follows for the Telnet Client embodiment. If a Telnet client session 209 is initiated from the iSeries platform 220, using Telnet client application emulator 201, and an ASCII display session is established, then the iSeries Telnet client 210 may check to see if the 'rendering display' of the Telnet client emulator 201 is capable of the new feature (i.e. checks the Display LUD 206 for device capability). If the 'rendering display' is capable of the new feature, then iSeries Telnet client 210 sends the newly architected 5250 structured field 298 (FIG. 10), via WSSF command 211, to let Telnet client emulator 201 know to enable the new feature and more specifically, in addition to setting appropriate control flags, it also may include a preferred encoding scheme 304 that the intelligent workstation based 5250 display emulator 210 can use for conveying/commmunicating interactive events inbound to the controlling application 210.

Encoding Scheme for Interactive Events

Encoding schemes 304 are represented by a variable length field (###) within the 6B structured field. Should a receiving 5250 display emulator 201 not support the directing application's suggested encoding scheme, it may negatively acknowledge with a recently architected x'10050158' sense code. Reception of the x'10050158 code by the 6B issuing application 210 is an indication that the application may re-attempt with a different encoding scheme, and iterate through several such schemes to select a best, supported scheme.

Such flexibility to direct an application 210 to employ a particular encoding scheme dramatically improves application portability. For example, the legacy iSeries/AS-400 based Telnet client 201 already has significant logic for dealing with special non-intuitive control sequence introducers, so it could be considered more convenient to negotiate an encoding scheme with a supporting 5250 emulator that passes introducer based encoding schemes into an iSeries Telnet emulator native keystroke logic for processing.

Capability Sense Code

Referring to FIG. 10, encoding scheme 304 is primarily an identity preference directed by the application 210 to the intelligent workstation emulator 201. Further, as described previously, it is possible for a workstation 201 to negatively-acknowledge an encoding scheme if it is not supported by responding with the x'10050158 sense code. In certain situations, the directing application 210, after confirming via the LUD (new bit) 208 that the 6B command is supported, might want to probe into the encoding scheme capabilities of the attached 6B capable workstation 201. This can be accomplished by trying various encoding schemes with separate 6B commands. Once application 210 has probed into the capabilities of workstation 201, it can make a last and effective encoding scheme designation.

Encoding Maps

The 6B command has an additional but optional field, encoding maps 308, to allow parameter passing or mapping table type information to be passed along with a particular encoding-scheme. Specifically, this free format field may include any dependent information associated with the particular encoding scheme. For example, if as described in the above example, a designated encoding scheme were to use the "iSeries Telnet introducer" scheme, but the native iSeries client Telnet application 210 controlling the display emulator prefers a different introducer character than the traditional "&", then it could communicate this fact in optional field 308. Another example might be related to what key-combinations were to be conveyed. That is, if an application doesn't have any existing logic to support ALT-char, but does support CTRL-char combinations, it could communicate such a fact in the optional field 308.

Error Detect Sense Code

Should the intelligent workstation emulator 201 discover an error in the modifier field it can communicate this back to the directing application 210 through another recently architected sense code x'10050159'. Once received, the application 210 can react accordingly, including by modifying and retrying the command.

Free Format Variable Fields

Both the encoding scheme 304 and the optional modifier 308 fields are free format variable fields serving as containers defined and agreed to by the directing application 210 at one end and the receiving intelligent workstation emulator 201 at the other.

Fixed control-flags 300 field includes basic controls for turning the feature on and off under explicit control of the driving application 210.

VT100 Emulation Mode

Referring to FIGS. 7 and 10, as an example, suppose an application, say the iSeries Telnet Client application 210, wants the client to enter into a VT100 type emulation mode with the Telent Client emulator 201. In this case the iSeries Telnet client application 210 sends an encoding scheme 304 of VT100 with the flag byte 300 set to enable. Both the iSeries Telnet Client application 210 and the Telent Client emulator 201 must know what this encoding scheme of VT100 means for interactive character IO processing (FIG. 12) to take place. The WSSF command for this example may be:

04F4 000B D9 6B 01 05 E5E3F1F0F0

Where E5E3F1F0F0 is the hexadecmal EBCDIC of character string VT100. In this example, optional Encoding Maps 308 are not used.

Encoding Maps Example

As an example using encoding maps 308, suppose the iSeries Telnet Client Application 210 wants the Telnet Client emulator 201 to use the "%" character as an introducer character rather than the traditional "&". In this case, the iSeries Telnet Client Application 210 sends the WSSF 6B command 292 with an Encoding Scheme 304 set to INTRODUCERMAP (EBCDIC hexadecamil value of C9D5E3D9D6C4E4C3C5D9D4C1D7) and an Encoding Map value of % (percent) (EBCDIC hexadecimal value of 6C). The WSSF command 290 (FIG. 10) for this example may would look like:

04F4 0016 D9 6B 01 0D C9D5E3D9D6C4E4C3C5D9D4C1D7 0001 6C

Any data can be passed using this technique to achieve interactive character IO, just so long as both the iSeries Telnet Client Application 210 and the Telnet Client emulator 201 both understand the data.

In this example, the new WSSF command type 298 will be 6B.

An encoding scheme is declared, which is known by both parties (the directing application 210 as well as the intelligent/enhanced 5250 workstation). The encoding scheme declared implies which of the extended keyboard character(s) the iSeries Telnet client application 210 would like the intelligent workstation's Telnet client emulator 201 to enable or disable.

Key Combination Flags

In the exemplary embodiment of the invention herein described, three non-graphic keys have been chosen to send. The flags are at the end of the datastream 211, so although one byte 300 is used to represent these flags, more bytes 302 can be added to represent more keys. Flags 300 indicate which special keys the iSeries Telnet Client 210 would like to receive either alone or in combination with graphic characters. When the iSeries Telnet Client 210 ends (in which case, it relinquishes exclusive control of the rendering display), the 6B command 298 will have to be sent with the flag bits 300 set to 0 to disable the new feature.

With new feature bit 208 enabled, non-graphic characters when typed at the keyboard of the local client 201, either alone or in combination with graphic characters, can be communicated and passed (transparently in native 5250 display mode) through the Telnet server 202 to the interactive job's application which happens to be the iSeries Telnet client 210.

Variant Data Stream for Extended Keyboard Character Communication

Communication of the extended keyboard characters when the new feature bit 208 is activated, using 5250 architecture datastreams as examples, is described hereafter.

Having previously described a feature bit 208 that defines the extended keyboard characters and a command 211 to activate/deactivate the feature of the invention, the mechanism to recognize and process the rendering display's emulated datastream that is generated when this new feature is active will next be described. In accordance with an exemplary embodiment of the invention, a system and method is provided for a receiving application 210 to know when a 5250 datastream that is being received from Telnet client emulator 201 contains extended keyboard character information. This is done by modifying an existing 5250 datastream for the Enter keystroke to a variant that is not normally sent by Telnet client emulators. This variant may be referred to as a benign variant, a variant which may be illogical yet is still a valid datastream. By way of example, this variant comprises an Enter keystoke that is received with two Set Buffer Address (SBA) commands to Row 0 Column 0 (a valid but illogical or otherwise unused data stream) and means that what follows is the extended keyboard character.

Figure 11:
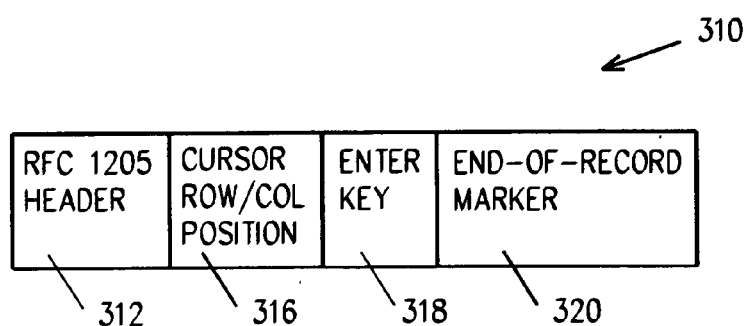
FIG. 11 illustrates a 5250 Data stream

Referring to FIG. 11, and before illustrating the variant, a normal inbound 5250 Enter keystroke datastream 310 is encapsulated into a 5250 mode Telnet session and includes RFC 1205 header 312, write to display operation code 314, cursor row/column position 316, enter key 318, and end-of-record marker 320. In the current Telnet 5250 architecture, when the 'Enter' key is pressed, a datastream consisting of the RFC 1205 header 312, the current row and column 316 of the cursor, the code 318 for the 'Enter' key, followed by End of Record (EOR) marker 320 is sent from the Telnet client emulator 210 to the Telnet server 202. In this native (5250) mode of operation to the rendering display, the iSeries Telnet server 202 effectively treats the 5250 datastream as a binary stream and routes it to/from the controlling application. In hexadecimal, the data stream is as follows:

000D12AO0000040000 03 1822 F1 FFEF where,

00OD12AO0000040000 is header 312,

| | |
|---|---|
| 03 | is the write to display op code 314, |
| 1822 | is the cursor row/column position 316 (here, row 24, col. 34), |
| F1 | is the enter key 318, and |
| FFFF | is end of record (EOR) marker 320. |

This example includes the RFC 1205 10 byte prepended header 312 as a typical embodiment. However, the preferred embodiments of the invention are not dependent upon TCP/IP Telnet, and are fully contained within the 5250 Architecture. Hence, any emulator or hardware based display workstation connected using SNA, Twin-Ax, IPX, as well as TCP/IP-Telnet can fully exploit this invention since they merely encapsulate or pre-pend header information to a 5250 architected datastream which completely incorporates the logic of the preferred embodiments. In accordance with the preferred embodiments of the invention, there is no "interpretation" of the 5250 datastream when it is passed through the Telnet Server 202 on the iSeries 220. The pre-pended (RFC-1205) 10 byte header 312 is primarily used to manage record level transactions between the rendering display when operating in TCP/IP Telnet mode.

Figure 12:
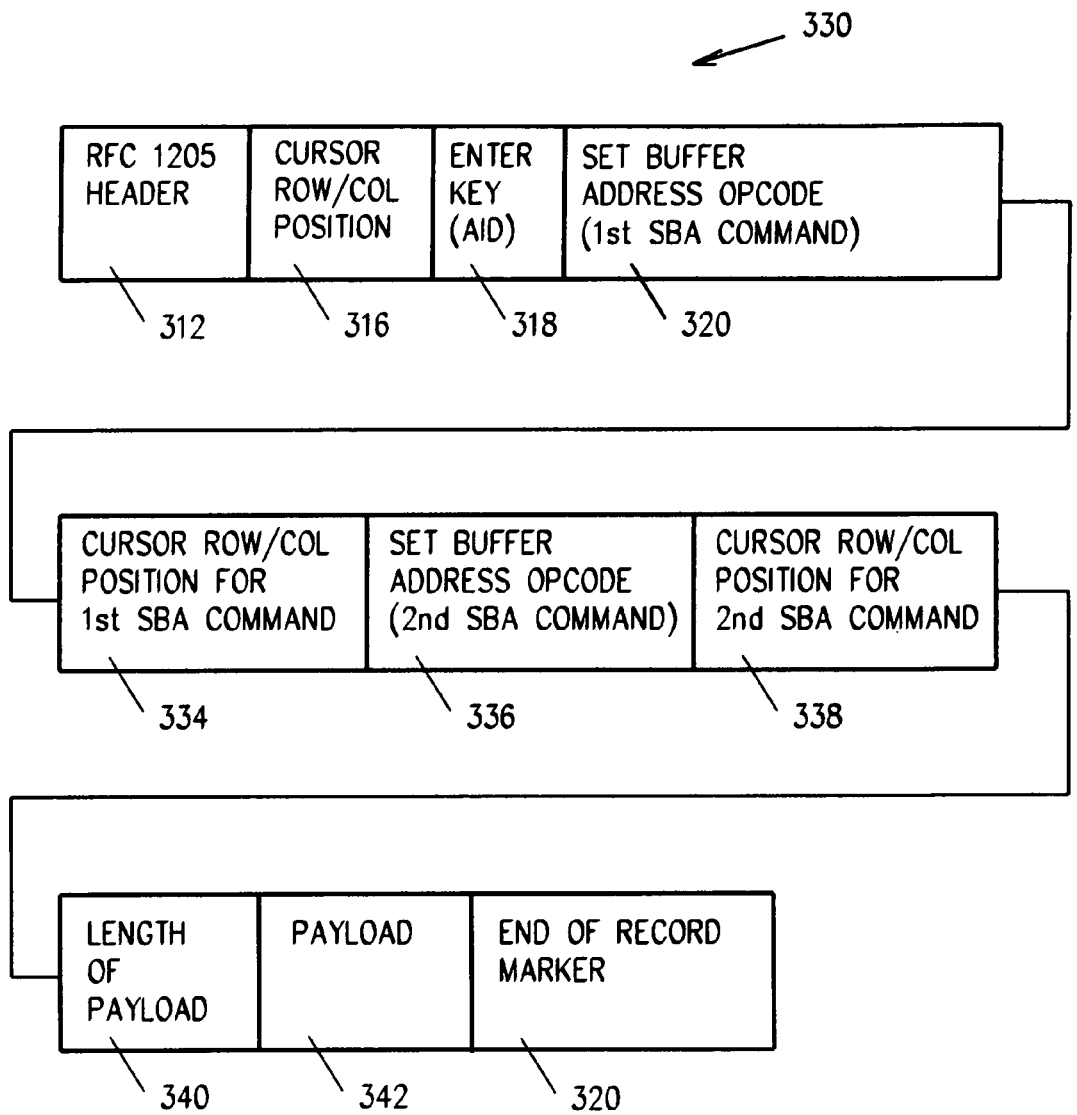
FIG. 12 illustrates a 5250 Data stream structure with the interactive character Input/Output Payload.

Referring now to FIG. 12, in accordance with an examplary embodiment of the invention, datastream 310 is modified into a variant 330 that is sufficiently unique (benign, yet valid) that it can be used to introduce extended keyboard characters whenever this function is active. This variant, or special, datastream is used to signal the application (ie iSeries Telnet client 210) that a negotiated non-graphic character has been sent. This datastream 330 has valid data as an introducer followed by a new free format payload field graphic described below. It is a characteristic of datastream 330 that it is something that Telnet client emulator 201 would not normally send, even though it is valid to send. This example datastream comprises enter key 318 followed by two Set Buffer Address (SBA) commands 332, 336 as an introducer. When iSeries Telnet client application 210 sees this special introducer, (two SBA commands 332, 336 addressed by 334, 338 to row 0 column 0), it will recognize it as the special "introducer".

Again, since the rendering display for this embodiment must operate in the native 5250 mode, the Telnet server 202 acts as a passthru device and simply passes the datastream transparently without inspection, nor interpretation to the controlling application. (In this example, the application receiving the unique datastream is the iSeries Telnet Client application 210.) There are no dependencies on the enapsulating protocol and with this creative signaling of the event via the unique (inbound) 5250 architected datastream pattern the dialogue between the rendering client (keyboard) and the 5250 based application are communicating on a transparent peer to peer level. An exemplary datastream comprises:

001512AO000004000003 1822 F1 11 0000 11 0000 LLLL PP FFEF where,

001512AO000004000003 is RFC 1205 header 312,

| | |
|---|---|
| 1822 | is cursor row/column position 316 for write to display (row 24, column 34), |
| F1 | is enter key 318, |
| 11 | is set buffer address opcode (first SBA command) 332, |
| 0000 | is cursor row/column position 334 for first SBA command (row 0, column 0), |
| 11 | is set buffer address opcode (second SBA command) 336, |
| 0000 | is cursor row/column position 338 for second SBA command (row 0, column 0), |
| LLLL | is the length 340 of the Payload |
| PP | is the Payload 342 |

Payload 342 is at the end of the datastream. Payload 342 is variable length to maximize its ability without affecting the design. This is just an example of an encoding and is purely a free format example of how both end points (the application 210 and the rendering display emulator 201) might communicate such events as "Left most shift key pressed and an associated displayable text based character".

Datastream Payload

More 5250 data stream examples follow.

If 'Ctrl' and V keys are pressed at same time, the data stream sent from the client emulator 201 to the iSeries Telnet server may be as follows:

001712AO0000040000 03 1822 F1 11 0000 11 0000 0002 2656 FFEF

Where,

| | |
|---|---|
| 0002 | is the length of the Payload. |
| 2656 | make up the Payload where, 26 is the hexadecimal ASCII '&', and 56 is the hexadecimal ASCII 'V'. |

When payload 342 sent to server 202, it can then be passed to the iSeries Telnet client 210 which does NOT convert the character from EBCDIC to ASCII (like it usually does), but instead the iSeries Telnet Client 210 interprets the Payload 342 as appropriate and converts it to the proper format (i.e. &C becomes OxO3), and passes it to UNIX Telnet server 212. As previously described, an alternative embodiment prefers to preserve application logic such as the referenced iSeries (native) Telnet example and has the ctrl-C keystroke combination passed using an introducer encoding wherein a value like "&C" could be conveyed from the workstation and passed directly into the existing application logic where it is expected to be processed in this particular format. In terms of the user interface, the problem of having to use un-natural non-intuitive key combinations has been solved. The user is in fact holding the control key down and pressing the capital "C". The resultant effect is the x'03' at the application interface of the distant ASCII server 212 host application, but conveyed to the Telnet server 202 using the "&C" shorthand.

When a graphic character is sent from the client emulator 201 through the iSeries platform 220, to the UNIX application at server 212, it is business as usual. Nothing different happens. (Alternative embodiments can use the encoding scheme to convey standard non-control text based characters as well.)

Connection Termination

When the connection 209 is terminated between the iSeries Telnet client 210 and the ASCII Telnet server 212, a WSSF 211 (with appropriate flag bit settings within the control-flag field) is sent from the iSeries Telnet client 210 to the Telnet client emulator 201 to toggle the new feature off. At this point all communications between the Telnet client emulator 201 and iSeries Telnet server 202 reverts to business as usual; that is, until the next application the interactive session may invoke inquires as to whether the rendering display has the capability to deal with character interactive I/O and proceeds to issue the WSSF Commands 211 to take control of the display session accordingly.

Advantages Over the Prior Art

It is an advantage of the invention that there is provided an improved system and method for rendering a common "look and feel" on different platforms and architectures.

It is a further advantage of the invention that there is provided an improved system and method enabling for character interactive I/O in a half duplex block mode environment.

It is a further advantage of the invention that there is provided a system and method for sending non-graphic keystrokes within the 5250 or the like architecture and have them processed as if they were ASCII or the like keystrokes.

It is a further advantage of the invention that there is provided a system and method for discovering a display which is capable of enhanced interactive functions (a 6B capable display) thru WSF/LUD bit testing.

It is a further advantage of the invention that there is provided a system and method for probing a supporting device for encoding schemes.

It is a further advantage of the invention that there is provided a system and method for selecting an encoding scheme known to imply a particular encoding method.

It is a further advantage of the invention that there is provided a system and method for passing processing parameters associated with an encoding scheme.

It is a further advantage of the invention that there is provided a system and method for passing mapping tables or other encoding scheme modification fields to a workstation.

It is a further advantage of the invention that there is provided a system and method for improving over the auto-enter method of triggering a text based non-control character keystroke by conveying such via an encoding scheme.

It is a further advantage of the invention that there is provided a system and method for conveying events including control-characters, alternate-characters, shift-characters, text based characters and virtually any interactive event including Mouse-based events such as pixel coordinates, mouse buttons, and light-pens.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390 (z Series), AS/400 (i Series), PC (x Series), RISC/6000 (p Series), or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While the exemplary embodiments of the invention have been described primarily with respect a preferred client server application of Telnet and thus to a TCP/IP environment, the invention is not limited to such. IPX and SNA network transports can also benefit for use of the invention. Also, when reference is made to the UNIX architecture, several flavors of UNIX are contemplated, including AIX, Linux, Sun, and so forth. RISC and Sun Solaris computers are most often associated with UNIX architecture, the iSeries computer is most often associated with 5250 architecture, and S/390 computers (such as those running the Virtual Machine (VM) operating system) most often associated with 3270 architecture. All these computer architectures can support the various network transports (TCP/IP, IPX, SNA, etc.) and therefore this invention can apply to the many variations and permutations of each possible network configuration.

The invention is not even limited to networking environments since a Twinax display with standard 5250 architectural support of the auto-enter feature can be programmed to exploit this invention, affording the character interactive I/O.

The iSeries Telnet client 210 is an example of an application running on the iSeries 220 that would take advantage of the invention. To use the application, Telnet session 209 and Telnet server 212 are used. However, the real work for the exemplary embodiments of the invention is done between workstation 201 and application 210. By the time data gets to Telnet session 209 and Telnet server 212 it is business as usual.

Thus, in accordance with the preferred embodiment of the invention, a 5250 based solution is provided which includes an enhancement to an iSeries (5250) display architecture including a 6B command, a Write Structured Field capability bit, and 10050158–10050159 sense codes. This functionally deploys an exemplary embodiment of the invention on an iSeries. With similar architectural enhancements to zSeries/390, identical results are achievable and to some degree, even without modifying the architecture, proprietary client workstations may implement the invention under control of their server side applications.

Accordingly, the scope of protection of this invention is limited only by the following claims and their equivalents.

The invention claimed is:

1. Method for establishing an interactive event dialog with a client at the application layer of a protocol stack including an application layer above a plurality of other layers including a link layer, comprising the steps of:
   establishing a half duplex block mode architecture connection with said client at said application layer;
   issuing a query command over said connection at said application layer to said client to discover client capabilities including state of extended keyboard characters, length of encoding scheme, encoding scheme, length of encoding maps, and encoding maps;
   receiving from said client over said connection at said application layer a response selectively including capability indicia identifying said client as capable of interactive event processing at said application layer; and
   responsive to said client providing said capability indicia, executing interactive event processing over said connection.

2. The method of claim 1, further comprising the step of registering said capability indicia for future reference.

3. The method of claim 2, said registering step further comprising the step of storing said capability indicia in a logical unit descriptor for reference by operating system utilities and applications.

4. The method of claim 2, further comprising the steps of:
   receiving a request from a client to run an application;
   determining presence of said capability indicia;
   responsive to said presence of said capability indicia, sending to said client a request to communicate according to an encoding scheme providing for communication of single keystrokes as they are entered while operating in said half duplex block mode.

5. The method of claim 4, said request being to communicate interactive events with a native application.

6. The method of claim 4, said request being to communicate interactive events with a cascaded application.

7. The method of claim 4, further comprising the steps of:
   receiving from said client a negative acknowledgment indicating inability to accept said encoding scheme; and
   selectively communicating an alternative encoding scheme to said client.

8. The method of claim 7, further comprising the step of iteratively sampling a plurality of encoding schemes to determine an acceptable encoding scheme.

9. The method of claim 4, further comprising the step of communicating to said client in association with said encoding scheme a map of encoding parameters.

10. The method of claim 4, further comprising the steps of:
    receiving from said client a packet, said packet including an introducer and a payload;
    said payload including interactive data encoded according to said encoding scheme; and
    said introducer identifying said payload as an encoded interactive event.

11. The method of claim 10, said introducer being an architecturally valid and benign order.

12. The method of claim 6, further comprising the steps of transferring data on an interface to said client in half duplex block mode, and to said cascaded application on a remote server in full duplex mode.

13. The method of claim 9, further comprising the steps of:
    receiving from said client a sense code rejecting said encoding map; and
    iteratively negotiating an encoding map acceptable to said client.

14. The method of claim 1, further comprising the steps of;
    sending to said client a request to communicate according to an encoding scheme; and
    upon receiving from said client a negative acknowledgment indicating inability to accept said encoding scheme, selectively communicating an alternative encoding scheme to said client.

15. The method of claim 14, further comprising the step of iteratively sampling a plurality of encoding schemes to determine an acceptable encoding scheme.

16. The method of claim 14, further comprising the step of communicating to said client in association with said encoding scheme a map of application layer keyboard and display encoding parameters.

17. The method of claim 14, further comprising the steps of:
    receiving from said client a packet, said packet including a benign and valid introducer and a payload;
    said payload including interactive data encoded according to said encoding scheme; and
    said introducer identifying said payload as an encoded interactive event.

18. The method of claim 14, further comprising the step of transferring data on an interface to said client in half duplex block mode and to a cascaded application on a remote server in full duplex mode.

19. The method of claim 16, further comprising the steps of:
    receiving from said client a sense code rejecting said encoding map; and
    iteratively negotiating an encoding map acceptable to said client.

20. A method for conducting an interactive event dialog, comprising the steps of:
    establishing a half duplex block mode connection between a first server and a client;
    establishing a full duplex mode connection between a client display based application and a second server;
    operating said client display based application and said first server to determine over said half duplex block mode connection the interactive event processing capabilities of said client;
    responsive to determining that said client is capable of interactive event processing, operating said client display based application to negotiate an encoding scheme acceptable to said client; and
    communicating with respect to said client and said client display based application data in half duplex block mode encoded in accordance with said encoding scheme and with respect to said client display based application and said second server in full duplex mode.

21. A system for establishing an interactive event dialog at the application layer with a client, comprising:

a half duplex block mode architecture connection at said application layer with said client;

a full duplex connection at said application layer with a remote server;

a server for issuing a query command to said client to discover client capabilities and for receiving from said client a response selectively including capability indicia identifying said client as capable of interactive event processing;

a display based application responsive to invocation by said client for sending to said client a request to communicate according to an encoding scheme;

said display based application further responsive to receiving data from said client according to said encoding scheme for communicating data on said full duplex connection with said remote server.

22. The system of claim 21, further comprising:

a descriptor store for storing said capability indicia for future use; and said server further accessing said descriptor store to determine said capability of said client to support interactive event processing.

23. A program storage device readable by a machine, tangibly embodying a program of instructions executable by a machine to perform method steps for establishing an interactive event dialog with a client at the application layer of a multi-layer protocol stack, said method steps comprising the steps of:

establishing a half duplex block mode architecture connection with said client at said application layer;

issuing a query command over said connection to said client to discover client capabilities including state of extended keyboard characters, length of encoding scheme, encoding scheme, length of encoding maps, and encoding maps;

receiving from said client over said connection a response selectively including capability indicia identifying said client as capable of interactive event processing; and responsive to said client providing said capability indicia, executing interactive event processing over said connection.

24. The program storage device of claim 23, said method steps further comprising the step of registering said capability indicia for future reference.

25. The program storage device of claim 23, said method steps further comprising:

responsive to the said presence of said capability indicia, sending to said client a request to communicate according to an encoding scheme.

26. The program storage device of claim 25, said method steps further comprising the steps of:

receiving from said client a negative acknowledgment indicating inability to accept said encoding scheme; and iteratively sampling a plurality of encoding schemes to determine an acceptable encoding scheme.

27. The program storage device of claim 25, said method steps further comprising the steps of:

communicating to said client in association with said encoding scheme a map of encoding parameters;

receiving from said client a packet, said packet including an introducer and a payload;

said payload including interactive data encoded according to said encoding scheme; and said introducer identifying said payload as an encoded interactive event.

28. The program storage device of claim 27, said method steps further comprising:

receiving from said client a sense code rejecting said encoding map; and iteratively negotiating an encoding map acceptable to said client.

29. The program storage device of claim 23, said method steps further comprising:

sending to said client a request to communicate according to an encoding scheme; and upon receiving from said client a negative acknowledgment indicating inability to accept said encoding scheme, selectively communicating an alternative encoding scheme to said client.

30. The program storage device of claim 28, said method steps further comprising the steps of:

communicating to said client in association with said encoding scheme a map of encoding parameters;

receiving from said client a packet, said packet including a benign and valid introducer and a payload;

said payload including interactive data encoded according to said encoding scheme;

said introducer identifying said payload as an encoded interactive event; and transferring data on an interface with said client in half duplex block mode and with a cascaded application on a remote server in full duplex mode.

31. A method for establishing an interactive event dialog with a client, comprising the steps of:

establishing a half duplex block mode architecture connection with said client;

negotiating capability indicia identifying said client as capable of interactive event processing;

communicating with a capable client over said half duplex connection according to an encoding scheme accepted by said client; and responsive to a request from said client for establishing a cascaded session with a remote server, communicating over a full duplex connection with said remote server.

* * * * *